Direct-Draft Attachment of Mowers & Reapers.
J. Winters.
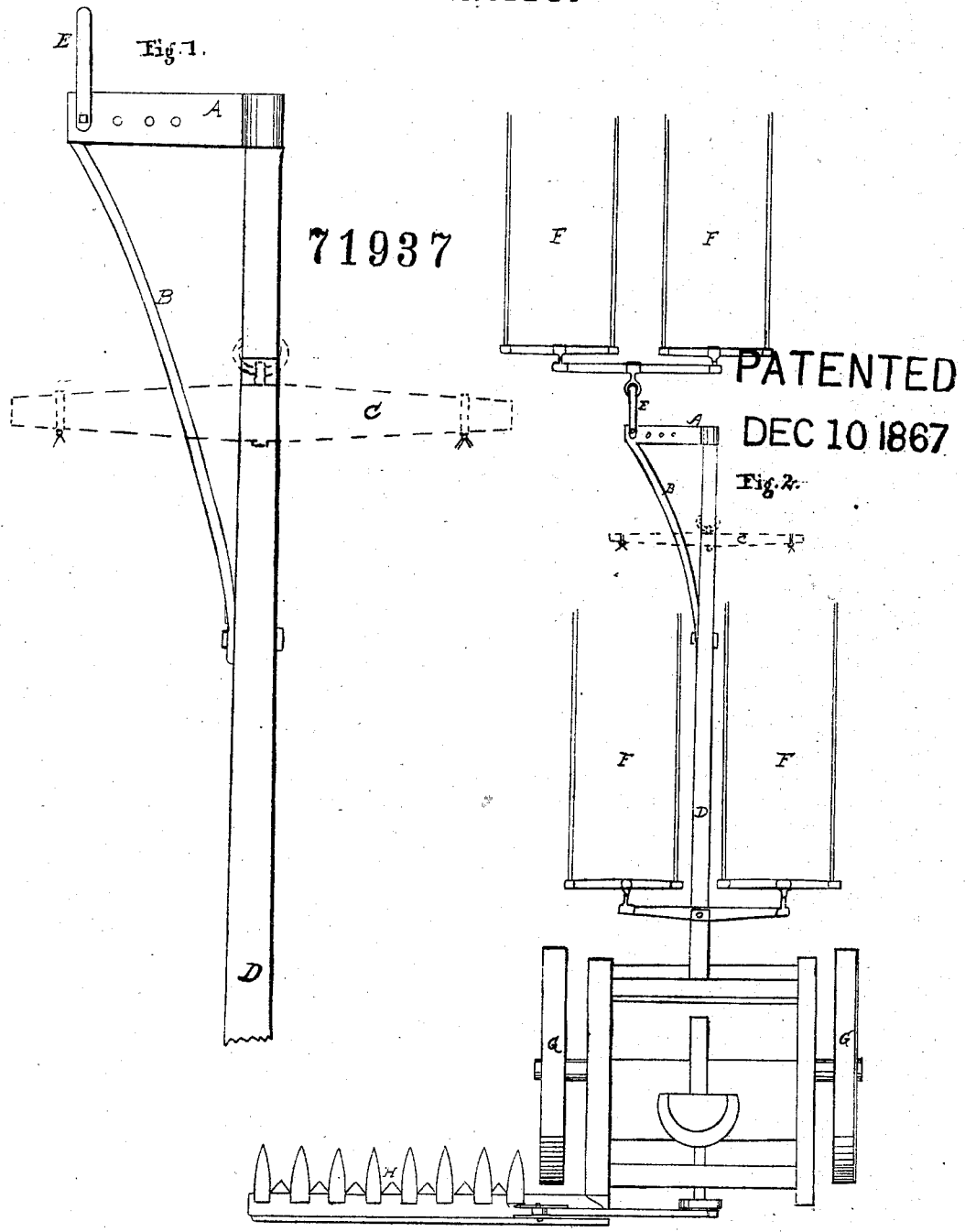

UNITED STATES PATENT OFFICE.

JAMES WINTERS AND CHARLES C. GAPEN, OF LACON, ILLINOIS.

IMPROVEMENT IN HARVESTERS.

Specification forming part of Letters Patent No. 71,937, dated December 10, 1867.

Be it known that we, JAMES WINTERS and CHARLES C. GAPEN, both of the city of Lacon, in the county of Marshall and State of Illinois, have invented a new and useful device called a Direct-Draft Attachment for Reaping and Mowing Machines; and we do hereby declare that the following is a full, clear, and exact description of the same, reference being had to the annexed drawings, making a part of this specification, in which—

Figure 1 is a view of a tongue having our invention applied thereto; and Fig. 2 represents the top view of the frame of a reaper or mower, showing our invention applied to the tongue, so as to obtain the direct draft.

A represents the skeleton clevis-frame; B, brace passing back and bolting to tongue back of neck-yoke; C, neck-yoke; D, tongue to reaper or mower; E, clevis attaching lead-horse to skeleton-frame; and, in the drawings, F F F F, position of horses; G G, driving or supporting wheels of reaper or mower; H, sickle.

The object of our invention is to prevent, in side-draft machines, the constant tendency to turn to one side out of the direct line of draft, which greatly increases the labor of the team, and tends to make the swath more or less irregular.

The drawings represent the frame and supporting-wheels of a common reaping or mowing machine, from one side of which the cutting apparatus projects at right angles. The pole or tongue is attached to and projects from the front side of the frame, equidistant between the supporting-wheels, in the ordinary manner; and instead of making its connection with the frame adjustable, as heretofore, to counteract the side draft, we attach to the front end of the tongue a skeleton iron or wood frame, A, with the ferrule passing over the end of the tongue, and brace B bolted to the tongue D and below neck-yoke C, so as to form with the tongue D, on the side thereof next to the cutting apparatus, a figure resembling a right-angled triangle. To the inner end of this skeleton-frame is attached an adjustable clevis, E. The wheel-horses are attached to the tongue in the ordinary way; but the lead-horses are attached to the clevis at the inner angle of the right-angled triangle, so that while the line of draft of the wheel-horses will be in the line of the tongue, and equidistant between the supporting-wheels, the line of draft of the lead-horses, changed and regulated by means of holes in the upper or short side of the triangle for moving the clevis, will be between the divider end of the reaper or mower and the tongue, and so adjusted as to equalize the draft of the machine by converting the side draft into a direct draft, which is the aim and object of our invention, and which we claim to be successful, and to make the reaper or mower run at least one-fourth easier.

We claim—

The skeleton-frame A, or its equivalent, provided with an adjustable clevis, and attached to the end of the tongue of reaping and mowing machines, substantially in the manner and for the purpose herein described and represented.

JAMES WINTERS.
CHARLES C. GAPEN.

Witnesses:
JAMES ST. CLAIR BOAL,
JOEL JONES.